Oct. 13, 1942.                H. C. SEXTON                  2,298,597
                    MACHINIST'S INTERNAL TESTING GAUGE
                            Filed Aug. 4, 1940
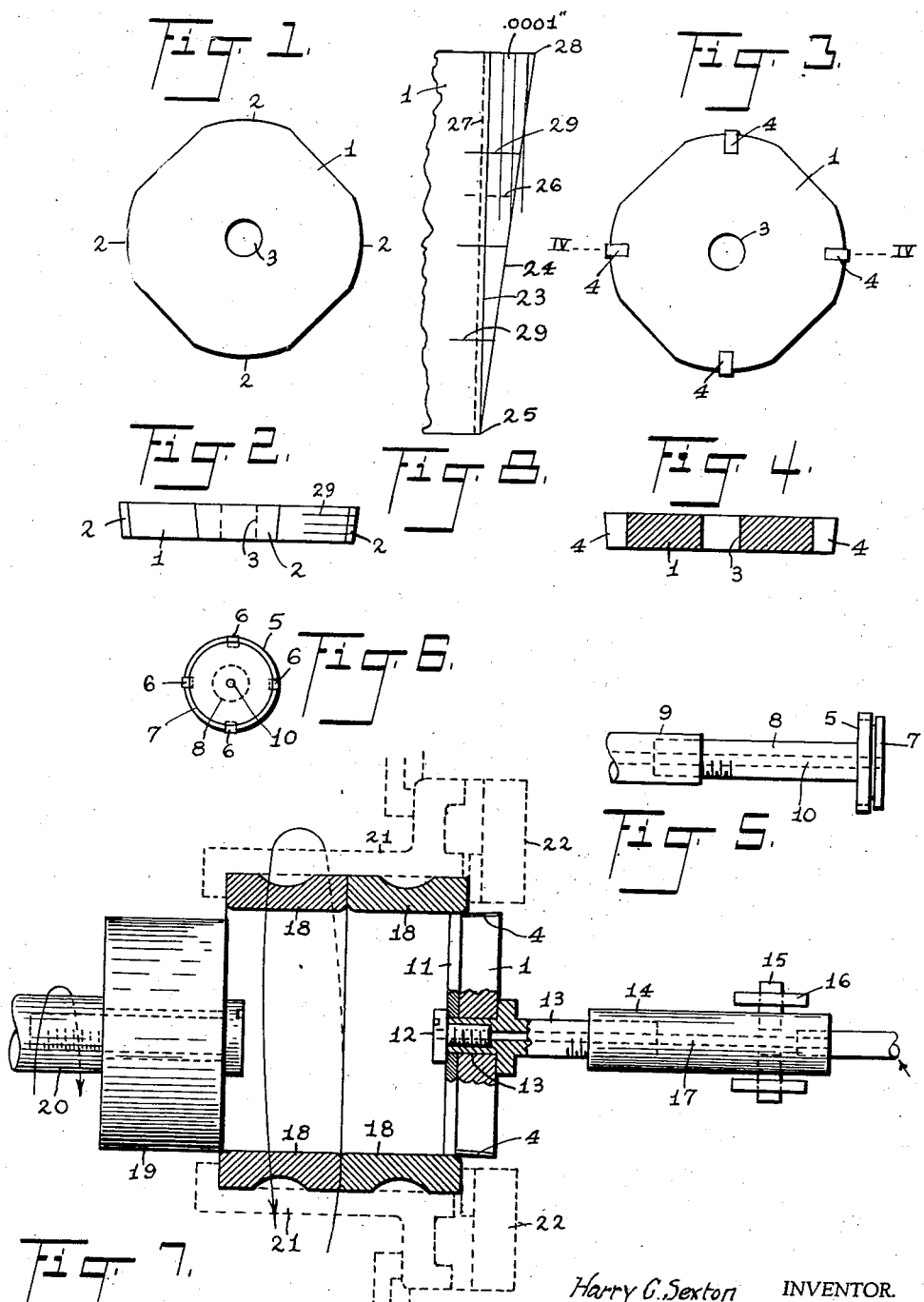

Patented Oct. 13, 1942

2,298,597

UNITED STATES PATENT OFFICE 2,298,597

MACHINIST'S INTERNAL TESTING GAUGE

Harry C. Sexton, Valparaiso, Ind.

Application August 4, 1940, Serial No. 351,391

5 Claims. (Cl. 33—178)

My invention relates to improvements in machinists' internal testing gauges and it more especially includes the features pointed out in the annexed claims.

The purpose of my invention is to provide an engineering testing gauge that will be useful over a long period of time; that will have a considerable range between its smallest and the largest dimensions; that because of these dimensions a tapered face is provided which extends the life of the gauge; that makes my gauge available for automatic testing where internal diameters are in question and the grinding wheel is positioned away from the parts that are being ground; and that withdraws the gauging fixture as the grinding is resumed.

With these and other purposes in mind I illustrate in the accompanying drawing such instances of adaptation as will disclose the broad features of the invention without limiting myself to the specific details shown thereon and described herein.

Fig. 1 is a front elevation of one form of my gauge.

Fig. 2 is a side elevation of Fig. 1.

Fig. 3 is a front elevation of a gauge with Carboloid inserts.

Fig. 4 is an elevation in section of Fig. 3 on line IV.

Fig. 5 is a side elevation of my gauge when made integral with its supported stop.

Fig. 6 is a front elevation of Fig. 5.

Fig. 7 is an elevation partly in section showing the relation of my gauging unit to the work that is being ground and the relation of the grinding wheel to the work.

Fig. 8 is a diagrammatic view showing, in approximate enlarged relation the tapered gauging face in comparison to an untapered face.

In practicing my invention I may employ whatever alternatives that may be found necessary under the varying exigencies of actual use without departing from the broad spirit of the invention.

In testing gauges of this type it is usual to have four bearing surfaces that are ground down to a definite tolerance dimension. These surfaces may be reinforced by a harder material such as "Carboloid." In practice the testing gauge is usually preceded by a roughing gauge. It is immaterial as to the actual diameter of these engaging surfaces because for large diameters naturally the dimensions are large but for very small bores the dimensions are correspondingly smaller. In any event the engaging surfaces are of extra hard material such as above mentioned or any conventional steel and these surfaces are tapered very slightly to the extent of approximately 0.0003 to 0.0004 inch.

In grinding internal rings or similar articles, such as ball races, etc., the grinding wheel only engages the surface that is being ground at one small portion of its circumference and it is immaterial whether or not the grinding wheel moves into the work or whether the work itself moves lengthwise of the axis of the grinding wheel. In any event the grinding wheel and the gauging fixture are conventionally connected together (not shown) so that, as the grinding wheel reaches the end of its inward travel the gauging fixture is moved out of its path. As the grinding wheel recedes to its starting point the gauging fixture follows until it touches the work, then the grinding wheel is again set into motion and the grinding operation is repeated to produce a slight increase in diameter.

For very small bores I may make the gauging element integral with the stem that connects it to the shifting arrangement for bringing the testing gauge into engagement with the ground work and automatically removing it from such work. In such an event at the front end of the stem the roughing gauge may be turned up from the solid, next to it there is a groove and then there follows the tapered gauge which may have "Carboloid" inserts. If the diameter of the gauge is such as to accommodate very large internal dimensions the gauge is secured onto a stem that is hollow for the passage of a cooling liquid and in the case of a small bore the stem itself on which the gauges are formed integrally is also supplied with a hole for the passage of the cooling medium directed against the grinding wheel and the surface of the articles that are being ground to dimension.

In a more detailed description the parts are referred to as follows:

The gauge 1 is usually made square with the corners rounded at 2. A central hole 3 is formed so as to assemble the gauge on a spindle. If the gauge 1, as shown, in Fig. 1 has the arcs 2 to become the gauging medium they are made without any reinforcements, but in Fig. 3 the inserts 4 in the faces 2 are of "Carboloid" and are tapered approximately as shown on exaggerated scale in Fig. 8.

In Fig. 5 the tapered gauge 5 and the roughing gauge 7 are turned up integrally on the stem 8 that is threaded into a rod 9 which may be connected with an automatic shifting mechanism. Between 7 and 5 a groove is formed to separate the two gauges. "Carboloid" inserts 6 are shown in Fig. 6 and the hole 10 is made through out the length of the stem 8 and its connecting rod for the passage of cooling liquid as heretofore mentioned.

In Fig. 7 the roughing gauge 11 and the tapered gauge 1 are secured onto a stem 13 where they are held by a screw 12. The stem 13 is threaded into an actuating rod 14 which may have projecting pins 15 engaged by a yoke 16 of the actuating mechanism (not shown) for moving the gauge to and fro in relation to the position of the grinding wheel 19. There is a hole 17 through the screw 12, the stem 13, and the rod 14 for the admission of cooling liquid to the inside of the surfaces that are being ground and to the grinding wheel.

The rings 18 that are being ground internally are acted on by the wheel 19 that is secured on a spindle 20 which may be interconnected for automatic movement with the shifting of a gauge by the rod 14. The work that is being ground is held in a so-called shuttle 21 shown in dotted lines on Fig. 7. It is held between a flange 21 and a face plate 22 supported in any desired form of chuck.

In Fig. 8 the contrast between an ordinary gauge and my tapered gauge is shown diagrammatically. A straight faced gauge is shown at 23. In contrast the bevel of my tapered gauge, shown at 24. The smallest external diameter is at 25 and the maximum external diameter at 28. A conventional tolerance is indicated at 26 and the amount of wear to which the gauge may be subjected. The gauge fixture rod 14 is conventionally spring pressed so that the related shifting mechanism between the wheel 19 and the gauge 1 cannot be jammed into the work.

It is an important element in gauging practice to have a gauge that will serve for a long time without exceeding the normal tolerances that a specific class of work demands. As a matter of fact, my gauge will ordinarily outwear several ordinary gauges. Thus, a greater uniformity of accuracy is secured in the work that is being turned out. As wear reduces an ordinary gauge, this discrepancy is constantly increasing so that toward the end of its life the dimension that it gauges will no longer be normal. All of this risk is entirely avoided by my tapered gauge. Ordinary gauges are usually only 0.125 of an inch thick, while in my tapered gauge the thickness may run up to 0.312 of an inch. The radius changes in taper are shown on Fig. 8 in 0.0001 inch on an enlarged horizontal scale.

Ordinary gauges whether of the plug type or other form have the same diameter throughout the thickness of the gauging disk or the length of the gauging surface of a plug type gauge. The moment such a gauge is put into use wear however small will commence and there is nothing to warn the user that an allowable tolerance has been exceeded. Such gauges having only a single uniform diameter, for internal gauging purposes, after they become worn must be replaced by new ones at considerable expense. Never at any time, whatever the degree of precision used in producing the gauge, does the gauge itself show that it has become worn past its allowable tolerance.

The actual condition during the use of such a used gauge can only be determined by passing it into an external ring having a standard inside dimension. Even then the extent of the wear is not determinable without the separate use of a machinist's micrometer. All this requires an inordinate amount of supervision of check and double check. This is entirely avoided by my form of gauge having a microscopic tapered diameter between its front end or entering face and its rear surface. This over-all taper includes a maximum allowable tolerance, between the two extremes of diameter. Within this microscopic range there is an ultra-precision tolerance that the delicately tapered gauge will indicate by the distance it enters the bore. This secures a degree of refinement that is absolutely unattainable with the ordinary form of test gauges for internal diameters. The maximum tolerance of my gauge can be less than the maximum tolerance of an ordinary gauge and between the minimum and maximum diameters of my gauge I secure, as stated above, an ultra refinement throughout a long use of the gauges without discarding them to be replaced by new ones.

In my form of gauges, single ones have been continuously used for separate testings exceeding several hundred thousand individual applications. The extra hardness of the material used, after such a long unprecedented availability has limited the wear of the hardened gauging surfaces to midway between the two extremes of diameter which is still a very small part of the allowable maximum tolerance.

What I claim is:

1. A gauging disk having a central hole, a plurality of faces in the periphery of the disk constituting nongauging portions, separate varying radii gauging arcs between such faces, all of said arcs being concentric with the central hole and having their gauging faces slightly beveled ranging from a minimum radius on one face through approximately three or four ten thousandths of an inch to the maximum radius on the other face, said gauging faces being specially hardened.

2. A unitary disk of very hard material and of substantial thickness having a central opening through its thickness, a discontinuous gauging periphery concentric with the axis of the opening, and a microscopic tapered face on each discontinuous portion of the periphery having a minimum tolerance in diameter of the entering face of the disk and a maximum tolerance in the diameter of the other face of the disk to provide long life of the extra hard material under continuous usage and extreme delicacy in the gauging steps to which the gauging disk is applied.

3. A unitary gauging disk of substantial thickness having a geometric center, a plurality of radially disposed axial notches in its periphery, separate nonadjustable gauging members of very hard material permanently inserted in such notches, said members having all their exposed faces of slightly varying radii concentric with the axis of the disk and each one of such faces being delicately tapered within microscopic limits throughout its axial length the radius of all the faces being the same between a maximum and minimum dimension whereby due to the delicate tapers said members have a long life under continuous usage and extreme microscopic delicacy in the gauging steps to which the gauging members are applied.

4. A precision gauge constituting a unitary body of disk form having considerable thickness adapted to standardize openings of uniform diameter throughout the length of the bore in a manufactured product which comprises a maximum change in diameter tolerance throughout the thickness of the gauge between its two faces, a minimum tolerance at the entering face, and a maximum tolerance at the other face of the gauge whereby a microscopic taper is formed within a range of approximately .0003", whereby a gauge of long life and maximum precision is produced.

5. A precision gauge constituting a unitary body of disk form having considerable thickness adapted to standardize openings of uniform diameter throughout the length of the bore of a manufactured product which comprises a maximum change of diameter tolerance through the thickness of the gauge between its two faces, a minimum microscopic tolerance in diameter at one face of the gauge and a maximum microscopic tolerance in diameter at the other face of the gauge whereby a minute taper is formed throughout the thickness of the body to secure a gauge of long life and ultra maximum precision.

HARRY C. SEXTON.